US012644028B2

(12) United States Patent
Yoshida

(10) Patent No.: US 12,644,028 B2
(45) Date of Patent: Jun. 2, 2026

(54) AQUEOUS ADHESIVE

(71) Applicant: Henkel AG & Co. KGaA, Duesseldorf (DE)

(72) Inventor: Yoshio Yoshida, Osaka (JP)

(73) Assignee: HENKEL AG & CO. KGaA, Duesseldorf (DE)

(*) Notice: Subject to any disclaimer, the term of this patent is extended or adjusted under 35 U.S.C. 154(b) by 0 days.

(21) Appl. No.: 17/467,743

(22) Filed: Sep. 7, 2021

(65) Prior Publication Data

US 2023/0078863 A1 Mar. 16, 2023

(51) Int. Cl.

| | |
|---|---|
| ***C09J 133/08*** | (2006.01) |
| ***A47G 21/18*** | (2006.01) |
| ***C08L 33/06*** | (2006.01) |
| ***C08L 33/08*** | (2006.01) |
| ***C08L 33/10*** | (2006.01) |
| ***C09J 7/21*** | (2018.01) |
| ***C09J 125/14*** | (2006.01) |
| ***C09J 133/10*** | (2006.01) |

(52) U.S. Cl.

CPC ............ *C09J 133/08* (2013.01); *A47G 21/18* (2013.01); *C08L 33/064* (2013.01); *C08L 33/08* (2013.01); *C08L 33/10* (2013.01); *C09J 7/21* (2018.01); *C09J 125/14* (2013.01); *C09J 133/10* (2013.01); *C08L 2201/52* (2013.01); *C08L 2205/025* (2013.01); *C09J 2301/312* (2020.08); *C09J 2301/408* (2020.08); *C09J 2433/00* (2013.01)

(58) Field of Classification Search

None

See application file for complete search history.

(56) References Cited

U.S. PATENT DOCUMENTS

| | | | | |
|---|---|---|---|---|
| 5,814,685 | A * | 9/1998 | Satake | C09D 11/326 525/902 |
| 5,954,866 | A * | 9/1999 | Ohta | C09D 11/322 106/31.89 |
| 6,368,707 | B1 * | 4/2002 | Kamiya | C09J 7/385 525/190 |
| 7,070,051 | B2 * | 7/2006 | Kanner | A61B 17/06133 206/460 |
| 11,214,675 | B2 | 1/2022 | Nabuurs et al. | |
| 2006/0247357 | A1 | 11/2006 | Willems et al. | |
| 2010/0056706 | A1 | 3/2010 | Flosbach et al. | |

FOREIGN PATENT DOCUMENTS

| | | | |
|---|---|---|---|
| CN | 102731710 | | 3/2015 |
| CN | 106459707 | A | 2/2017 |
| CN | 108779318 | A | 11/2018 |

(Continued)

OTHER PUBLICATIONS

Aldrich Data Sheet (Year: 2022).*

(Continued)

*Primary Examiner* — Frank D Ducheneaux

(74) *Attorney, Agent, or Firm* — Sun Hee Thomas

(57) ABSTRACT

Disclosed is an aqueous adhesive comprising a copolymer obtainable by polymerizing a plurality of monomers, wherein the plurality of monomers comprise a (meth)acrylic acid ester, and the aqueous adhesive is applied to a paper tube. Also disclosed is a paper tube coated with the aqueous adhesive which is used for paper straws.

10 Claims, 1 Drawing Sheet

(56) References Cited

FOREIGN PATENT DOCUMENTS

| | | | |
|---|---|---|---|
| EP | 3246372 | A1 | 11/2017 |
| JP | 105117618 | A | 5/1993 |
| JP | H061939 | A | 1/1994 |
| JP | H06133840 | A | 5/1994 |
| JP | H06136335 | A | 5/1994 |
| JP | H0711217 | A | 1/1995 |
| JP | H1030077 | A | 2/1998 |
| JP | 2000119621 | A | 4/2000 |
| JP | 2000282004 | A | 10/2000 |
| JP | 2002188069 | A | 7/2002 |
| JP | 2005272706 | A | 10/2005 |
| JP | 4412699 | B2 | 2/2010 |
| JP | 3218847 | U | 11/2018 |
| JP | 7346054 | B2 | 9/2023 |
| KR | 20040083808 | A | 10/2004 |
| WO | 2020196416 | A1 | 10/2020 |

OTHER PUBLICATIONS

Data Sheet for SOLURYL_820 (Year: 2015).*

International Search Report PCT/JP2020/012746 Completed: Jun. 18, 2020; Mailing Date: Jun. 26, 2020 4 Pages.

Chemtex: "Sumikaflex 408HQE," Feb. 5, 2010 (Feb. 5, 2010), XP09329718, Retrieved from the internet: URL: https://www.chemtex.co.jp/english/division/emulsion/product/tech_data_pdf/S408HQE.pdf.

* cited by examiner

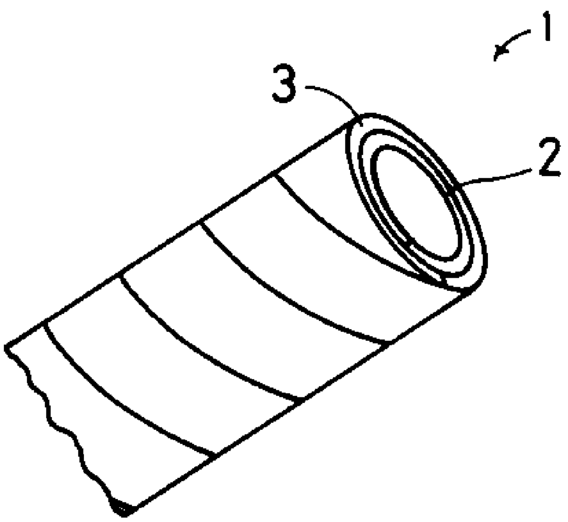
1
3
2

AQUEOUS ADHESIVE

CROSS-REFERENCE TO RELATED APPLICATIONS

The present application is a continuation of International Patent Application Number PCT/JP2020/012746 filed Mar. 23, 2020 entitled AQUEOUS ADHESIVE, and claims priority under 35 U.S.C. 119 (a)-(d) to Japanese Patent Application Number JP2019-63985 filed Mar. 28, 2019 entitled AQUEOUS ADHESIVE; which are incorporated herein by reference in their entirety.

FIELD OF THE INVENTION

The present invention relates to a paper tube which is used for paper straws, and an aqueous adhesive which is applied to the paper tube.

BACKGROUND OF THE INVENTION

Commonly, most of straws are made of plastic, and the number of straws used per day is extremely high although the volume of one straw is not high. Therefore, huge amounts of straw wastes occur around the world every day.

Plastic straws cannot be naturally decomposed and are difficult to be disposed of. When plastic straws are incinerated, dioxin may be generated, leading to air pollution. In recent years, there becomes a problem that disposed plastic straws may flow into the ocean and break down into microscopic fragments, which may be ingested by fishes in the ocean, and the fishes may be eaten by human.

To solve these problems, repeatedly usable stainless steel straws or glass straws have appeared on the market. However, these straws have high costs and can be repeatedly used only after washing and sterilization, and are inconvenient as portable straws, and thus they are not useful as a substitute for plastic straws.

Taking these problems into consideration, a study has been made on paper straws which are easy to be disposed of (see Patent Literatures 1 and 2).

The straw of Patent Literature 1 is a paper tube made of a paper material, and the paper tube is formed of an internal paper material which is spirally wound in the inside and an external paper material which is wound on the outer surface of this internal paper material. The internal paper material and the external paper material are bonded each other with a coating agent (e.g., a solution obtainable by dissolving a polyvinyl alcohol resin in paraffin) in a slightly displaced state (see Patent Literature 1, [0007], [0012], [FIG. 1], [FIG. 2]).

Patent Literature 2 discloses a straw formed by winding a paper sheet many times with overlapped (see Patent Literature 2, [Claim 1], [0026], [FIG. 1], [FIG. 2]).

When a paper straw is produced, it is necessary to use a resin having excellent water resistance as an adhesive to bond paper materials together, considering safety. As shown in Patent Literatures 1 and 2, the paper material of the paper straw is coated with a polyvinyl alcohol resin or a vinyl acetate resin as a resin which is difficult to soluble in water and has high safety (see Patent Literature 1, [Claim 1], [0007], and Patent Literature 2, [0024]).

BRIEF SUMMARY OF THE INVENTION

However, it cannot be said that the paper straws of Patent Literatures 1 and 2 sufficiently meet the demand for recent strict safety. Especially in the food industry, the demand for safety by customers has been increased year by year, and there is a tendency to eliminate factors which adversely affect the human body and environment as possible, with respect to eating utensils and straws.

Therefore, it is considered that a water-based adhesive is preferable to a solvent-based adhesive disclosed in Patent Literature 1, as a resin composition to be applied to the paper straw, and it is desired for the resin composition to have higher level of water resistance and excellent safety of a polymer in an aqueous medium (i.e., safety of an emulsion).

In light of these circumstances, the present invention has been made and an object thereof is to provide an aqueous adhesive with excellent water resistance and stability which is applied to a paper tube, and a paper tube useful for the human body and environment which is used for paper straws.

As a result of continued intensive study, the present inventors have found that an emulsion comprising a copolymer obtainable by polymerizing a plurality of specific monomers is excellent in water resistance and stability, and an aqueous adhesive including this copolymer emulsion and a paper tube coated with the aqueous adhesive can solve the problem, thus completing the present invention.

The present description includes the following embodiments.

1. An aqueous adhesive comprising a copolymer obtainable by polymerizing a plurality of monomers, wherein the plurality of monomers comprise a (meth)acrylic acid ester, and the aqueous adhesive is applied to a paper tube.

2. The aqueous adhesive according to 1, wherein the plurality of monomers further comprise styrene.
3. The aqueous adhesive according to 2, wherein the content of the styrene is 20 to 50 parts by mass based on 100 parts by mass of the monomers.
4. The aqueous adhesive according to any one of 1 to 3, wherein the copolymer has a glass transition temperature of 30° C. or lower.
5. The aqueous adhesive according to any one of 1 to 4, wherein the copolymer is obtainable by polymerizing the plurality of monomers in the presence of a polymer having a carboxyl group as a stabilizer.
6. The aqueous adhesive according 5, comprising the stabilizer in an amount of 10 to 50 parts by mass based on 100 parts by mass of the total mass of the monomers.
7. The aqueous adhesive according 5 or 6, wherein the stabilizer has an acid value of 100 to 300 mgKOH/g.
8. The aqueous adhesive according to any one of 5 to 7, wherein the stabilizer has a chemical structure derived from a (meth)acrylic resin.
9. A paper tube coated with the aqueous adhesive according to any one of 1 to 8.

The aqueous adhesive according to the embodiment of the present invention comprises a copolymer emulsion obtainable by polymerizing a plurality of monomers and is applied to a paper tube, and the plurality of monomers comprise a (meth)acrylic acid ester, and thus excellent water resistance and stability are imparted.

The paper tube coated with the aqueous adhesive is used for paper straws, and thus the resulting paper tube is safe to the human body and is easy to be disposed of, and is environmentally excellent.

BRIEF DESCRIPTION OF THE DRAWINGS

FIG. 1 is a perspective view schematically showing a paper straw as a paper tube according to the embodiment of the present invention.

DETAILED DESCRIPTION OF THE INVENTION

The aqueous adhesive according to the embodiment of the present invention is an aqueous adhesive comprising a copolymer emulsion obtainable by polymerizing a plurality of monomers, and is applied to a paper tube, for example, a paper straw.

In the embodiment of the present invention, the plurality of monomers comprise a (meth)acrylic acid ester.

In the present description, the "(meth)acrylic acid" indicates both acrylic acid and methacrylic acid, and means including at least one of acrylic acid and methacrylic acid.

The "(meth)acrylic acid ester" refers to an ester of (meth) acrylic acid, that is, (meth)acrylate. The (meth)acrylate indicates both acrylate and methacrylate, and means including at least one of acrylate and methacrylate.

A vinyl ester having a structure in which a vinyl group and oxygen are bonded, for example, vinyl acetate and the like is not included in (meth)acrylate in the present description.

Specific examples of the (meth)acrylate include (meth) acrylic acid alkyl esters such as methyl (meth)acrylate, ethyl (meth)acrylate, propyl (meth)acrylate, isopropyl (meth) acrylate, butyl (meth)acrylate, 2-ethylhexyl (meth)acrylate, pentyl (meth)acrylate, hexyl (meth)acrylate, cyclohexyl (meth)acrylate, octyl (meth)acrylate, decyl (meth)acrylate, dodecyl (meth)acrylate, tridecyl (meth)acrylate, octadecyl (meth)acrylate, and biphenyl (meth)acrylate; and (meth) acrylic acid hydroxyalkyl esters such as 2-hydroxyethyl (meth)acrylate, 2-hydroxybutyl (meth)acrylate and 2-hydroxypropyl (meth)acrylate.

These (meth)acrylates can be used alone, or two or more (meth)acrylates can be used in combination.

In the embodiment of the present invention, the (meth) acrylic acid ester is preferably a (meth)acrylic acid alkyl ester. More specifically, methyl (meth)acrylate, butyl (meth) acrylate or 2-ethylhexyl (meth)acrylate are preferably included, and n-butyl acrylate or 2-ethylhexyl acrylate is particularly preferably included. Homopolymers of n-butyl acrylate and 2-ethylhexyl acrylate have a low glass transition temperature (hereinafter referred to as Tg).

The copolymer is preferably obtainable by polymerizing n-butyl acrylate or 2-ethylhexyl acrylate with other monomers. In this case, a Tg of the copolymer can be adjusted to a low temperature, thus enabling an improvement in water resistance of the aqueous adhesive.

In the embodiment of the present invention, the monomer may include other monomers in addition to the (meth)acrylic acid ester. As long as the aqueous adhesive according to the embodiment of the present invention can be obtained, the other monomers are not particularly limited. Styrene is preferably included as the other monomers. A homopolymer of styrene has a Tg of 100° C. Regarding a copolymer emulsion obtainable by polymerizing a (meth)acrylic acid ester having a low Tg (e.g., a homopolymer of n-butyl acrylate has a Tg of −54° C., a homopolymer of 2-ethylhexyl acrylate has a Tg of −70° C.) with styrene, the Tg is easily adjusted by the amount of styrene blended, thus making it easier to control the water resistance of the aqueous adhesive.

The content of the other monomers is not particularly limited and, for example, the content of styrene is preferably 20 to 50 parts by mass based on 100 parts by mass of the total mass of the monomers. When the content of styrene is within the above range, the Tg of the copolymer is easily adjusted, thus making it easier to control the water resistance of the aqueous adhesive.

The Tg of the copolymer is preferably 30° C. or lower, particularly preferably −40° C. to 15° C., more preferably −40° C. to 0° C., and most preferably −35° C. to −20° C. When the Tg of the copolymer is within the above range, the aqueous adhesive according to the embodiment of the present invention is more excellent in water resistance and stability.

In the present description, the glass transition temperature of the copolymer is calculated from a glass transition temperature of a homopolymer (hereinafter also referred to as "homopolymer Tg") obtainable by homopolymerizing monomers used as raw materials of the copolymer. Considering this homopolymer Tg and a mixing ratio (parts by mass) of each monomer, the Tg is determined. Specifically, the Tg of the copolymer can be determined by calculating using the following formula (1):

$$1/Tg=C_1/Tg_1+C_2/Tg_2+\ldots+C_n/Tg_n \qquad \text{Formula (1):}$$

where, in the calculation formula (1), Tg is a theoretical Tg of a copolymer, $C_n$ is mass percentage of the nth monomer n included in a monomer mixture, $Tg_n$ is a homopolymer Tg of the nth monomer n, and n is the number of monomers constituting the copolymer and is a positive integer.

It is possible to use, as the homopolymer Tg, the value mentioned in the literature. The literature includes, for example, "POLYMER HANDBOOK" (4th edition; published by John Wiley & Sons, Inc.). As an example, homopolymer Tg of monomers mentioned in POLYMER HANDBOOK are shown below.

Methyl methacrylate ("MMA", Tg=105° C.)
n-Butyl acrylate ("n-BA", Tg=−54° C.)
2-Ethylhexyl acrylate ("2EHA", Tg=−70° C.)
Styrene ("St", Tg=100° C.)
Acrylic acid ("AA", Tg=106° C.)
Methacrylic acid ("MAA", Tg=130° C.)
n-Butyl methacrylate ("BMA", Tg=20° C.)

In the present description, it is possible to apply, in addition to the Tg of the homopolymer obtainable by homopolymerizing the above monomers, a glass transition temperature (Tg) of a homopolymer obtainable by homopolymerizing other monomers to the formula (1).

In the embodiment of the present invention, the copolymer is preferably a copolymer obtainable by polymerizing at least one of n-butyl acrylate and 2-ethylhexyl acrylate with styrene. When the copolymer comprises the above components, the Tg is easily adjusted to 30° C. or lower, thus improving the water resistance of the aqueous adhesive according to the embodiment of the present invention.

In the embodiment of the present invention, the copolymer can be produced in an form of an emulsion. The solid component concentration of the copolymer emulsion is not particularly limited, but is preferably 5 to 70% by mass in copolymer emulsion components. The solid component of the emulsion refers to a solid component obtainable by drying the emulsion at 105° C. for 3 hours.

The copolymer emulsion of the embodiment of the present invention is obtainable by emulsion polymerization of a plurality of monomers. The emulsion polymerization is performed in water or an aqueous medium by use of an emulsifier, and a known method can be used.

The emulsifier promotes particle dispersion stability by being fixed on a surface of polymer particles during or after polymerization. Examples of the emulsifier include anionic surfactants, nonionic surfactants, cationic surfactants, amphoteric surfactants, polymer surfactants and the like.

To improve the water resistance, the alkali resistance and the waterproof property, it is preferable to use a "reactive surfactant" having a radically polymerizable double bond in one molecule of the emulsifier.

The copolymer emulsion according to the embodiment of the present invention is preferably obtainable by emulsion polymerization of a plurality of monomers in a state where a stabilizer (e.g., a polymer having a carboxyl group, a polymer having a hydroxyl group) exists in an aqueous medium. The stabilizer has an effect of stabilizing a solid component of the emulsion in the aqueous medium to disperse the solid component, and a polymer having a carboxyl group is preferable.

Herein, the "aqueous medium" means common water such as tap water, distilled water or ion-exchanged water, but may include an organic solvent which is soluble in the aqueous medium and has poor reactivity with raw materials (e.g., monomers) of the copolymer according to the embodiment of the present invention, for example, acetone and ethyl acetate, and may further include monomers, oligomers, prepolymers and/or resins which are soluble in the aqueous medium. As mentioned later, the aqueous medium may include emulsifiers, polymerizable emulsifiers, polymerization reaction initiators, chain extenders and/or various additives which are commonly used for the production of a water-based resin or a water-soluble resin.

In the embodiment of the present invention, the polymer having a carboxyl group serving as the stabilizer preferably has a chemical structure derived from a (meth)acrylic resin, which is preferably a modified (meth)acrylic resin.

In the embodiment of the present invention, the modified (meth)acrylic resin is a synthetic resin having a carboxyl group obtainable by polymerizing at least one selected from (meth)acrylic acid and a (meth)acrylic acid ester. In the present description, the modified (meth)acrylic resin is a copolymer obtainable by copolymerizing at least one selected from (meth)acrylic acid and a (meth)acrylic acid ester with other monomers.

Examples of the modified acrylic resin include a styrene/acrylic acid copolymer, a styrene/acrylic acid/acrylic acid ester copolymer, a styrene/methacrylic acid copolymer, a styrene/methacrylic acid/methacrylic acid ester copolymer and the like. When using the modified acrylic resin as the stabilizer, the aqueous adhesive according to the embodiment of the present invention is more excellent in stability and water resistance.

In the embodiment of the present invention, the stabilizer is preferably blended in an amount of 10 to 50 parts by mass based on 100 parts by mass of the total mass of the monomers. When the amount of the stabilizer is within the above range, particles (solid component) of the copolymer emulsion can be stably dispersed in the aqueous medium. When dispersion of the copolymer emulsion becomes stable, the aqueous adhesive according to the embodiment of the present invention is more excellent in stability and water resistance.

The acid value of the polymer having a carboxyl group according to the embodiment of the present invention is preferably 100 to 300 mgKOH/g, more preferably 150 to 250 mgKOH/g, particularly preferably 180 to 220 mgKOH/g, and most preferably 190 to 210 mgKOH/g. When the acid value of the polymer having a carboxyl group is within the above range, the water resistance of the aqueous adhesive is more improved.

The "acid value" of the copolymer having a carboxyl group according to the embodiment of the present invention is represented by a calculated value of a number of milligrams of potassium hydroxide required to neutralize an acid assuming that all of acid groups included in 1 g of the copolymer are liberated acids. Therefore, even if existing as a base in the system, it is considered as a liberated acid.

This corresponds to an acid group possessed by a monomer serving as a raw material of the polymer having a carboxyl group (hereinafter referred to as "raw monomer"). In the embodiment of the present invention, the "acid value" can be determined by the following formula (2).

Acid value=((mass of raw monomer/molecular weight of raw monomer)×number of mols of acid group included in 1 mol of raw monomer× formula weight of KOH×1,000/mass of polymer having a carboxyl group ($A$)) Formula (2):

The aqueous adhesive according to the embodiment of the present invention has a form of an emulsion, which may include a copolymer in an emulsion form, and may include a stabilizer, and the stabilizer may include a polymer having a carboxyl group. The aqueous adhesive may further include, as additives, crosslinking agents, viscosity modifiers, plasticizers, antifoaming agents, preservatives, colorants and the like. These additives may be blended after synthesizing the copolymer emulsion, or may be blended in advance with monomers serving as raw materials of the copolymer emulsion, or may be added to the aqueous adhesive in an emulsion form. Those mentioned above in the copolymer emulsion can be referred to the aqueous adhesive in an emulsion form according to the embodiment of the present invention.

Examples of the crosslinking agents include zinc acetate, zinc oxide, zirconium acetate, zirconium ammonium carbonate and the like. These crosslinking agents can be used alone or in combination.

Examples of the viscosity modifiers include nitrogen-containing substances such as urea, urea compound and dicyandiamide; calcium hydroxide, calcium oxide, sodium carbonate, trisodium phosphate, di ammonium hydrogen phosphate, borax, sodium fluoride, water glass, ammonia water and the like.

Examples of the plasticizers include glycerin; polyhydric alcohols such as ethylene glycol and propylene glycol; saccharides such as sucrose and sorbitol; and organic solvents such as cellosolves.

Examples of the antifoaming agent include:

silicone-based antifoaming agents such as dimethylpolysiloxane, polyoxyalkylene-modified silicones, organic modified polysiloxanes and fluorine silicones;

oils and fats-based antifoaming agents such as castor oil, sesame oil, linseed oil, and animal and plant oils;

fatty acid-based antifoaming agents such as stearic acid, oleic acid and palmitic acid;

fatty acid ester-based antifoaming agents such as isoamyl stearate, diglycollauric acid, distearylsuccinic acid, distearic acid, sorbitanmonolauric acid, glycerin fatty acid esters, polyoxyethylene sorbitan, butyl stearate monolaurate, sucrose fatty acid esters, ethyl acetate alkyl esters of sulfonated ricinoleic acid, and natural waxes;

alcohol-based antifoaming agents such as polyoxyalkylene glycol and derivatives thereof, polyoxyalkylene alcohol hydrate, diamylphenoxy ethanol, 3-heptanol and 2-ethylhexanol;

ether-based antifoaming agents such as 3-heptylcellosolve and nonylcellosolve-3-heptylcarbitol;

phosphate ester-based antifoaming agents such as tributyl phosphate, sodium octyl phosphate and tris(butoxyethyl)phosphate;

amine-based antifoaming agents such as diamyl amine;

amide based antifoaming agents such as polyalkyleneamide, acylate polyamine and dioctadecanoyl piperidine;

metal soap-based antifoaming agents such as aluminum stearate, calcium stearate, potassium oleate, and calcium salts of wool olein; and sulfonate ester-based antifoaming agents such as sodium lauryl sulfonate and sodium dodecyl sulfonate.

It is possible to use the aqueous adhesive according to the embodiment of the present invention for producing a paper tube. The paper tube is obtainable by winding a paper material and coating a surface of the paper material with the aqueous adhesive according to the embodiment of the present invention.

FIG. 1 schematically shows, as a paper tube according to the embodiment of the present invention, for example, a paper straw. As shown in FIG. 1, a paper tube (paper straw) 1 comprises an internal paper material 2 which is spirally wound in the inside and an external paper material 3 which is wound on the outer surface of this internal paper material 2, and the internal paper material 2 and the external paper material 3 are bonded each other with an aqueous adhesive (not shown) in a slightly displaced state.

The paper straw 1 according to the embodiment of the present invention may take various forms, in addition to the form shown in FIG. 1, and may take a form by winding of a paper sheet many times with overlapped.

The paper tube according to the embodiment of the present invention is excellent in water resistance and therefore can be used for, in addition to paper straws, cores for toilet papers, information papers, calendars, films, tapes and carpets, and packing materials as a substitute for corrugated cardboards, and the like.

EXAMPLES

The present invention will be described below by way of Examples and Comparative Examples. It should be noted that these Examples are intended to describe embodiments of the present invention and the present invention is not limited thereto. In Examples, unless otherwise specified, parts by weight (or mass) and percentages by weight (or mass) are based on a part where a solvent is not taken into consideration.

The aqueous adhesives according to the embodiments of the present invention were prepared from (A) a stabilizer, (B) a monomer (a polymerizable monomer having an ethylenic double bond) and (C) an ethylene vinyl acetate (EVA) copolymer emulsion.

Using the component (A), the component (B) and the component (C) according to the formulation shown in Table 1, aqueous adhesives of Examples 1 to 5 and Comparative Examples 1 to 2 were produced. Details of the components (A) to (C) are shown below.

(A) Stabilizer (A-1) Polymer having a carboxyl group (JONCRYL679 (trade name), manufactured by BASF Japan Ltd.) and an acid value of 200 mgKOH/g (A-2) Polymer having a carboxyl group (SOLURYL 820 (trade name), manufactured by Hanwha Chemical Corporation) and an acid value of 205 mgKOH/g (A-3) Polymer having a hydroxyl group (OKS-8041 (trade name), manufactured by The Nippon Synthetic Chemical Industry Co., Ltd.) and an acid value of 0 mgKOH/g (A-4) Polymer having a hydroxyl group (DENKA POVAL B-17 (trade name), manufactured by Denka Company Limited) and an acid value of 0 mgKOH/g (A-5) Polymer having a hydroxyl group (DENKA POVAL B-24T (trade name), manufactured by Denka Company Limited) and an acid value of 0 mgKOH/g (B) Monomer (Polymerizable Monomer Having an Ethylenic Double Bond)

(B-1) Butyl acrylate (n-butyl acrylate)

(B-2) 2-Ethylhexyl acrylate (B-3) Styrene (B-4) Methyl methacrylate (B-5) Vinyl acetate (C) Ethylene Vinyl Acetate Copolymer (EVA) Emulsion (C-1); Sumikaflex 408HQE (manufactured by Sumitomo Chemical Company, Limited)

Production of Aqueous Adhesive of Example 1

In a four-necked flask equipped with a stirring blade, a thermometer and a reflux condenser, 100 parts by mass of distilled water, 40 parts by mass of (A-1) and 7 parts by mass of 25% ammonia water were charged. After stirring while blowing a nitrogen gas into the four-necked flask, the liquid temperature was maintained at 70° C.

Meanwhile, a mixture of 75 parts by mass of (B-1) and 25 parts by mass of (B-3), and an aqueous solution of 1.3 parts by mass of sodium persulfate and 19 parts by mass of water were prepared.

About 4% by volume of the mixture and about 30% by volume of the aqueous solution were respectively charged in the four-necked flask. After stirring to initiate emulsion polymerization, the remaining (about 96% by volume) mixture and the remaining (about 70% by volume) aqueous solution were simultaneously added dropwise in the four-necked flask over about 4 hours.

After completion of the dropwise addition, stirring was continued for about an hour and a half while maintaining the liquid temperature at 70° C., and then the reaction mixture thus obtained was cooled to room temperature. The reaction mixture was adjusted to pH 8 by adding ammonia water to give an aqueous adhesive. This aqueous adhesive is an emulsion because of its turbidity, and is therefore an emulsion composition. The glass transition temperature of the copolymer of (B) shown in Table 1 is the value theoretically calculated based on the Tg of the homopolymer of the monomer (B).

The test result of the aqueous adhesive thus obtained is shown in Table 1.

Production of Aqueous Adhesives of Examples 2 to 5

Using the same manner as in Example 1, except that each component was changed as shown in Table 1, aqueous adhesives of Examples 2 to 5 were produced. The test results of the aqueous adhesives thus obtained are shown in Table 1.

Comparative Example 1

Using the respective components changed as shown in Table 1, a vinyl acetate emulsion including polyvinyl alcohol as a stabilizer was produced by a conventional method. Specifically, 225-1025 manufactured by Henkel Japan Ltd. was used.

Comparative Example 2

As the ethylene vinyl acetate copolymer (EVA) emulsion, Sumikaflex 408HQE manufactured by Sumitomo Chemical Company, Limited was used as it is.

The aqueous adhesives thus obtained were evaluated by the following procedures.

1. Stability

Each of the synthesized aqueous adhesives was dispensed into 100 ml aliquots, followed by dilution with 100 ml of distilled water to prepare samples. After storage at room temperature for 24 hours, the state of each sample was visually observed. Evaluation criteria are as follows.

A: Coagulation, precipitation and separation of the copolymer of (B) were not observed in all samples and the samples were found to be a uniform emulsion.

B: Coagulation, precipitation or separation of the copolymer of (B) was observed in less than 30% of samples.

C: Coagulation, precipitation or separation of the copolymer of (B) was observed in 30% or more of samples.

2. Water Resistance

Using a bar coater, an aqueous adhesive was applied on a common high-quality (or wood-free) paper and, immediately after application, the high-quality paper and an uncoated high-quality paper were bonded each other and then dried at 105° C. for 5 minutes to fabricate a laminated sample. This laminated sample was cut into pieces of 2.5 cm in length, followed by immersion in 50 ml of distilled water at 60° C. and further observation of the state after immersion. Evaluation criteria are as follows.

A: Peeling does not occur at a bonding surface after 1 hour and a high-quality paper causes material fracture when peeling by hands.

B: Peeling does not occur at a bonding surface after 1 hour and a high-quality paper peels off at a bonding interface when peeling by hands.

C: Peeling occurs at a bonding surface after 1 hour.

TABLE 1

| | | Example | | | | | Comparative Example | |
|---|---|---|---|---|---|---|---|---|
| | | 1 | 2 | 3 | 4 | 5 | 1 | 2 |
| Composition | | | | | | | | |
| (A) | (A-1) | 40 | 30 | 40 | | | | |
| | (A-2) | | | | 30 | 40 | | |
| | (A-3) | | | | 2.4 | | | |
| | (A-4) | | | | | | 2 | |
| | (A-5) | | | | | | 1 | |
| (B) | (B-1) | 75 | 75 | | 70 | | | |
| | (B-2) | | | 65 | | 65 | | |
| | (B-3) | 25 | 25 | 35 | 30 | | | |
| | (B-4) | | | | | 35 | | |
| | (B-5) | | | | | | 100 | |
| (C) | (C-1) | | | | | | | 100 |
| Tg of copolymer of (B) | | −29° C. | −29° C. | −31° C. | −23° C. | −31° C. | 32° C. | 0° C. |
| Evaluation | | | | | | | | |
| Stability | | A | A | A | A | A | A | C |
| Water resistance | | A | A | A | A | A | C | C |

As shown in Table 1, the aqueous adhesives of Examples 1 to 5 comprise a copolymer of a plurality of monomers, the copolymer having a chemical structure derived from a (meth)acrylic acid ester, and are therefore excellent in both stability and water resistance.

The aqueous adhesive of Comparative Example 1 comprises a homopolymer of vinyl acetate and does not comprise a copolymer having a chemical structure derived from a (meth)acrylic acid ester. The aqueous adhesive of Comparative Example 2 comprises a commercially available ethylene-vinyl acetate copolymer, but does not have a chemical structure derived from a (meth)acrylic acid ester.

Therefore, the aqueous adhesives of Comparative Examples 1 and 2 are remarkably inferior in water resistance. The aqueous adhesive of Comparative Example 2 is also inferior in stability.

As is apparent from a comparison between the aqueous adhesives of Examples and the aqueous adhesives of Comparative Examples, the aqueous adhesives of Examples are excellent in both stability and water resistance because of having a chemical structure derived from a polymer of a (meth)acrylic acid ester.

According to the present invention, it is possible to provide an aqueous adhesive applied to a paper tube. The aqueous adhesive according to the embodiment of the present invention is applied to a paper material, and a paper tube (e.g., a paper straw, etc.) is produced from the paper material.

What is claimed is:

1. A paper tube comprising:

an internal paper that is spirally wound; and an external paper that is wound on an outer surface of the internal paper, wherein the internal paper and the external paper are bound to each other with an aqueous adhesive, wherein the aqueous adhesive comprises a copolymer prepared by copolymerizing:

(A) a (meth)acrylic acid ester monomer selected from the group consisting of methyl (meth)acrylate, ethyl (meth) acrylate, propyl (meth)acrylate, isopropyl (meth)acrylate, butyl (meth)acrylate, 2-ethylhexyl (meth)acrylate, pentyl (meth)acrylate, hexyl (meth)acrylate, cyclohexyl (meth)acrylate, octyl (meth)acrylate, decyl (meth)acrylate, dodecyl (meth)acrylate, tridecyl (meth) acrylate, octadecyl (meth)acrylate, biphenyl (meth) acrylate, 2-hydroxyethyl (meth)acrylate, 2-hydroxybutyl (meth)acrylate, 2-hydroxypropyl (meth)acrylate, and any mixture thereof; and (B) 20 to 50 parts by mass calculated by mass based on 100 parts by mass of the (meth)acrylic acid ester monomer (A) of a styrene monomer, wherein:

(a) the copolymerization is conducted in the presence of a polymer having (i) a chemical structure derived from a (meth)acrylic resin in an amount of from 10 to 50 parts by mass based on 100 parts by mass of the total mass of monomers and (ii) an acid value in the range of about 180 to 220 mg KOH/g as a stabilizer, and (b) the copolymer has a glass transition temperature in the range from about −35° C. to −20° C., wherein the aqueous adhesive further comprises at least one of a crosslinking agent, a viscosity modifier, a plasticizer, an antifoaming agent, a preservative, or a colorant, and wherein the aqueous adhesive has a water resistance of at least 1 hour, as evaluated by no peeling at the interface of the internal paper and the external paper bond during immersion in distilled water at 60° C.

2. The paper tube of claim 1, wherein the (meth)acrylic acid ester monomer is selected from the group consisting of methyl (meth)acrylate, butyl (meth)acrylate, 2-ethylhexyl (meth)acrylate, n-butyl acrylate, 2-ethylhexyl acrylate, and any mixture thereof.

3. The paper tube of claim 2, wherein the (meth) acrylate acid ester monomer is n-butyl acrylate.

4. The paper tube of claim 2, wherein the (meth) acrylate acid ester monomer is 2-ethylhexyl (meth)acrylate.

5. The paper tube of claim 1, wherein the styrene monomer is copolymerized with the polymer selected from the group consisting of acrylic acid copolymer, acrylic acid/acrylic acid ester copolymer, methacrylic acid copolymer, and methacrylic acid/methacrylic acid ester copolymer.

6. The paper tube of claim 1, wherein the copolymerization is conducted in the further presence of an emulsifier.

7. The paper tube of claim 6, wherein the emulsifier promotes particle dispersion stability by being fixed on a surface of polymer particles during or after polymerization.

8. The paper tube of claim 6, wherein the emulsifier is selected from the group consisting of an anionic surfactant, a nonionic surfactant, a cationic surfactant, an amphoteric surfactant, a polymer surfactant, and any combination thereof.

9. The paper tube of claim 1, wherein the viscosity modifier is selected from the group consisting of urea, dicyandiamide, calcium hydroxide, calcium oxide, sodium carbonate, trisodium phosphate, di ammonium hydrogen phosphate, borax, sodium fluoride, water glass, ammonia water, and any mixture thereof.

10. The paper tube of claim 1, wherein the acid value is in the range of about 190 to 210 mg KOH/g.

* * * * *